3,344,097
COATING COMPOSITIONS COMPRISING ALKYLOLATED ACRYLAMIDE-OTHER VINYL MONOMER-DRYING OIL INTERPOLYMERS
Harold H. Flegenheimer, Newark, N.J., assignor, by mesne assignments, to Celanese Coatings Company, a corporation of Delaware
No Drawing. Filed Feb. 3, 1964, Ser. No. 342,250
12 Claims. (Cl. 260—21)

This invention in one of its aspects relates to novel interpolymers of N-alkoxymethyl acrylamides, such as N-butoxymethyl acrylamide or N-butoxymethyl methacrylamide. In another of its aspects, the invention pertains to primers and other coating compositions containing modified N-alkoxymethyl acrylamide interpolymers.

Compositions of interpolymers of N-alkoxymethyl acrylamide blended with various modifying agents are finding increasing utility in the industrial coatings field. Thus in U.S. 2,870,117, it is disclosed that valuable coating compositions can be obtained by blending N-alkoxymethyl acrylamide interpolymers with an epoxide resin. The resulting coating compositions form films with remarkable flexibility, recoat adhesion and freedom from undesirable color formation, particularly on overbake. The improved properties are obtained without any loss of the desirable properties possessed by N-alkoxymethyl acrylamide interpolymers.

It has also been discovered that outstanding coating compositions can be obtained by blending N-alkoxymethyl acrylamide interpolymers with a vinyl resin. Compositions of such vinyl resins as vinyl halide and vinyl acetate or propionate copolymers in combination with N-alkoxymethyl acrylamide interpolymers form films with excellent chemical and solvent resistance. In U.S. 2,870,-116, it is stated that such films bake readily to a hard thermoset state, particularly useful in thermal insulation.

N-alkoxymethyl acrylamide interpolymers are also modified with alkyd resins. In U.S. 2,940,945, it is pointed out that films of N-alkoxymethyl acrylamide interpolymers while possessing many outstanding properties tend to be too brittle for some applications. The recoat adhesion of some of these interpolymers also tends to be poor. When N-alkoxymethyl acrylamide interpolymers are modified by blending them with short oil length alkyds, resulting compositions form films which have excellent flexibility and very good recoat adhesion.

Thus, modified N-alkoxymethyl acrylamide interpolymers form useful industrial finishes, for instance, for appliances such as ranges, refrigerators, air conditioners, washers, water heaters and the like. However, in the three compositions described in the foregoing patents, modification is obtained by blending the N-alkoxymethyl acrylamide interpolymer with another composition such as an alkyd resin, an epoxide resin or a vinyl resin. In accordance with the practice of this invention, N-alkoxymethyl acrylamide interpolymers are also modified to bring about an improvement in properties. Modification herein, however, is accomplished internally. Rather than blending N-alkoxymethyl acrylamide interpolymers with another resin, improved properties are obtained through the use of modifying monomers.

The three patents to which reference has been made show that the N-alkoxymethyl acrylamide interpolymers are made from acrylamide or methyl acrylamide after polymerization. The acrylamide in the interpolymer is reacted with an alkanol and formaldehyde, generally under acid conditions, to form the N-alkoxymethyl group. Thus, if formaldehyde and butanol are used, N-butoxymethyl acrylamide results as shown in U.S. 3,079,434.

The N-alkoxymethyl acrylamide can be made first and then copolymerized with another monomer. However, side reactions are mitigated by starting with the acrylamide or methacrylamide interpolymer, rather than the monomer. The three patents referred to show interpolymers of acrylamide and at least one other monomer having a $CH_2=C<$. Thus, any of thet known vinyl monomers can be polymerized with the acrylamide. Among the monomers described in the prior art are methyl acrylate, ethyl acrylate, butyl acrylate, isobutyl acrylate, hexyl acrylate, octyl acrylate, styrene, vinyl toluene, maleate esters such as dibutyl maleate, acidic materials such as acrylic acid, methacrylic acid, maleic anhydride, vinyl ethers, vinyl ketones, vinyl pyridines, allyl acetoacetates, glycidyl acrylates, methacrylamide, dimethylbenzyl methacrylate, durenediol dimethacrylate, and the like. In addition, such monomers can be employed as monofunctional vinyl heterocyclic compounds, for instance, N-vinyl carbazole, vinyl furane, vinyl cyclohexene, vinyl dibenzofuran or monovinyl ethers, for example ethyl vinyl ether, ethyl methallyl ether, vinyl butyl ether, phenyl vinyl ether, methyl vinyl ether and others of not over twenty carbon atoms, or monovinyl ketones, for instance, methyl vinyl ketone, methyl allyl ketone, ethyl vinyl ketone and the like of not over twenty carbon atoms. Also contemplated are the vinyl halides such as vinyl chloride, the various vinylidene compounds, vinylidene chloride, vinylidene bromide.

This invention thus pertains to internal modification of interpolymers of acrylamides. There is provided herein an interpolymer of an N-alkoxymethyl acrylamide, the alkoxy group having less than 10 carbon atoms, at least one other vinyl monomer copolymerizable therewith, and, as a modifier, sufficient drying oil to form 5 to 60 weight percent of the interpolymer. It is understood that various combinations of the well known monomers and drying oils with the acrylamide will yield modified interpolymers having different physical properties. The most desirable compositions will be obtained from monomer combinations wherein 10 to 40 percent of the N-alkoxymethyl acrylamide is employed. A desirable combination is 15 to 30 percent N-butoxymethyl acrylamide, 20 to 40 weight percent drying oil with the remainder being styrene or vinyl toluene. In general, therefore, this invention contemplates an interpolymer of an N-alkoxymethyl acrylamide, the alkoxy group having less than 10 carbon atoms, at least one other vinyl monomer copolymerizable therewith, and, as a modifier, sufficient drying oil to form 5 to 60 weight percent of the interpolymer, said interpolymer containing 10 to 40 percent of an alkoxymethyl acrylamide, and at least 10 percent vinyl monomer, the total being 100 percent.

Since the N-alkoxymethyl acrylamides and the vinyl monomers copolymerized therewith are well known, as shown in the art, reference need be made herein only to the drying oil modifier. The term "drying oil" includes semi-drying oils, that is those oils having iodine numbers in the range of 100 to 150. Hence, drying oils contemplated herein, including semi-drying oils, are such oils as perilla oil, safflower oil, soybean oil, sunflower oil, tung oil, oiticica oil, dehydrated castor oil, cottonseed oil, linseed oil, tall oil, corn oil, and fish oils. Dehydrated castor oil is, of course, obtained from castor oil, and castor oil and the other oils are obtained from naturally occurring sources.

In preparing the modified N-alkoxymethyl acrylamide interpolymers, polymerization is effected by known solution polymerization techniques with or without peroxide catalysts. The preferred procedure for conducting these reactions is to copolymerize the oil, acrylamide and the vinyl monomers to a conversion greater than 98 percent using free radical promoting catalysts. The percent conversion is determined by heating a weighed sample of the reactants for twenty minutes at about 392° F. and weighing the residue, said residue being the polymer formed in the reaction. The percent conversion can be calculated using the weight of sample before and after heating.

When the polymerization is complete, the polymer is reacted with formaldehyde in an alcohol such as ethanol, propanol, butanol, etc. containing less than ten carbon atoms, using a small amount of acid catalyst to keep the pH of the solution slightly below 7. The rate and extent of the reaction, which is believed to be a methylolation with formaldehyde followed by etherification with alcohol, is measured by the amount of water released in the reaction. When no more water can be removed, the reaction is complete. The polymeric solution can then be used to prepare protective coatings and films.

The compositions of this invention can also be made starting with the N-alkoxymethyl acrylamide or methacrylamide and copolymerizing this with a different vinyl monomer and the drying oil. The compositions can also be made by first polymerizing the drying oil with the vinyl monomer. Thus, it may be desired to start with a styrenated drying oil. To illustrate the preparation and use of compositions of this invention, the following specific examples are given. It is to be understood, however, that the examples are for the purpose of illustration only and that the invention is not to be limited to any specific compounds or conditions recited therein. Parts disclosed in the examples are parts by weight.

*Example 1*

To a 12 liter flask equipped with agitator, reflux condenser, thermometer and monomer inlet tube are added 889.9 parts of xylene, 1250 parts of dehydrated castor oil and 125 parts of cumene hydroperoxide. In a separate container 2500 parts of styrene, 565 parts of acrylamide, 125 parts of cumene hydroperoxide and 2475.7 parts of n-butanol are mixed and co-dissolved. Ten percent of this monomer mixture is then added to the reaction flask, heat and agitation are applied raising the temperature to reflux (262° F.). The remainder of the monomer solution is then added over a one-hour period holding the temperature at reflux (250° F. to 262° F.). After all the monomer solution is added, the temperature of the reactants is held at reflux for 9.5 hours until 98.2 percent conversion of monomers to polymer is obtained.

The polymer solution is cooled to 200° F. and 1193.5 parts of Butyl Formcel (52.5 percent butanol, 7.5 percent water and 40 percent formaldehyde) and 13.3 parts of maleic anhydride are added to the flask. The flask is fitted with a Dean-Stark azeotropic distillation apparatus, and heat is applied. At a temperature of 222° F., water begins to distill. Heating is continued for 11 hours, during which time water is continuously removed by distillation and the temperature rises to 247° F. After 11 hours heating, no more water distills over, the total amount of water removed being approximately 230 parts. The flask contents are cooled and filtered. The polymer solution has a Gardner-Holdt viscosity at 50 percent solids in a 50/50 mixture of xylene and n-butanol of S to T; the weight per gallon is 7.84; the Gardner color is 3 to 4; and the acid value is 2.6.

Films are prepared from this solution on steel panels bonderized with zinc phosphate. Clear, well cured films are obtained after a 20 minute bake at 350° F. These films pass an 80 inch-pound bump test with no cracking or other film failure. They have a pencil hardness of H, and a hardness of 7B after three minutes in xylene. Their detergent resistance (Tide water at 165° F.) is excellent, film failure occurring only after 283 hours immersion.

*Example 2*

Using the same procedure as described in the preceding example, 75 parts of oiticica oil are reacted with 1125 parts of styrene and 149 parts of methacrylamide in 288 parts of xylene and 745 parts of n-butanol using 90 parts of cumene hydroperoxide as catalyst. After the polymerization reaction is complete (98.6 percent conversion), the polymer solution is further reacted with 262.5 parts of Butyl Formcel and 4 parts of maleic anhydride. The resulting solution has a viscosity of V to W at 50 percent solids, in a 50/50 mixture of xylene and n-butanol, weight per gallon of 7.94, color 5 to 6, and acid value 2.8.

Films prepared from this solution are well cured after a 20 minute bake at 350° F. They have good gloss and adhesion and a pencil hardness of H.

*Example 3*

To a 5 liter flask equipped as described in Example 1 are added 355.4 parts of xylene, 700 parts of alcoholized decastor oil (604.9 parts of dehydrated castor oil reacted with 95.1 parts of pentaerythritol) and 50 parts of cumene hydroperoxide. In a separate container a monomer solution is prepared from 800 parts of styrene, 226 parts of acrylamide, 990.1 parts of n-butanol and 50 parts of cumene hydroperoxide. Ten percent of this solution is added to the reaction flask, and heat is applied raising the temperature to reflux (264° F.). The remaining monomer solution is added over a one-hour period while holding the temperature at reflux (252° F. to 264° F.). Heating at reflux is continued for seven hours until 99.1 percent conversion of monomers to polymers is obtained.

After cooling to room temperature, the reaction flask is fitted with the azeotropic distillation apparatus and 477.4 parts of Butyl Formcel and 5.3 parts of maleic anhydride are added. The flask contents are heated for six hours at 233° F. to 237° F. until no more water distills, 90 parts of water being removed. The polymer solution is cooled and filtered. The viscosity at 50 percent solids in a 50/50 mixture of xylene and n-butanol is P to Q, the weight per gallon 7.98, color 8 to 9, and acid value 2.4.

Films are prepared from this solution on steel panels bonderized with zinc phosphate. Clear, well cured films are obtained after heating for twenty minutes at 350° F. These films pass an 80 inch-pound bump test and have a pencil hardness of H. Their hardness after three minutes in xylene is 7B and their resistance to detergent (Tide at 165° F.) is 283 hours before failure.

*Example 4*

Using the same procedure as described in the preceding examples, 1500 parts of dehydrated castor oil, 2000 parts of styrene, and 679 parts of acrylamide are coreacted in 1706 parts of xylene and 2354 parts of n-butanol using 150 parts of cumene hydroperoxide as polymerization catalyst. When 98.1 percent conversion to polymer is obtained, further reaction is carried out with 1450 parts of Butyl Formcel and 20 parts of maleic anhydride. The resulting solution has a viscosity of W to X at 50 percent solids in a 50/50 mixture of xylene and n-butanol, weight per gallon 7.92, color 6 to 7, and acid value 4.2.

Films prepared from this solution on steel panels bonderized with zinc phosphate, are well cured after a twenty minute bake at 350° F. They pass an 80 inch-pound bump test, have a pencil hardness of F, an ad hardness of less than 7B after three minutes in xylene. They resist failure in detergent water (Tide at 165° F.) for 283 hours.

*Example 5*

Using the same procedure as described in the preceding examples, 1500 parts of dehydrated castor oil are reacted with 1500 parts of styrene, 1000 parts of ethyl acrylate and 453.3 parts of acrylamide in 1893.3 parts of xylene and 2379.9 parts of n-butanol using 150 parts of cumene hydroperoxide as free radical catalyst. When 99.2 percent reaction is obtained, the polymer is further reacted with 953.3 parts of Butyl Formcel and 13.3 parts of maleic anhydride. The resulting solution has a viscosity of V to W at 51 percent solids in a 50/50 mixture of xylene and n-butanol, a weight per gallon of 7.89, color of 5 to 6, and an acid value of 2.2.

Films prepared from this solution on steel panels bonderized with zinc phosphate are well cured after a twenty minute bake at 350° F. These films pass an 80 inch-pound bump test, thus exhibiting excellent flexibility and adhesion.

*Example 6*

To a 5 liter flask equipped as in the preceding examples are added 307 parts of xylene, 45 parts of cumene hydroperoxide and 150 parts of cottonseed oil. In a separate container, 600 parts of vinyl toluene, 525 parts of butyl acrylate, 102 parts of acrylamide, 745 parts of n-butanol, and 45 parts of cumene hydroperoxide are codissolved. Ten percent of this solution is added to the reaction flask, and heat is applied raising the temperature to reflux (269° F.). The remainder of the monomer solution is added over a one-hour period while holding the temperature at reflux (256° F. to 269° F.). The temperature is held at reflux for three hours until 98 percent reaction is obtained. The temperature is lowered to 200° F., and 215 parts of Butyl Formcel and 4 parts of maleic anhydride are added. The flask is fitted with an azeotropic distillation trap and heat is reapplied. When the temperature reaches 241° F., water begins to distill. Heating is continued for five hours at 241° F. to 245° F. until no more water distills, a total of 39 parts of water being removed.

The solution has a viscosity of H to I at 50 percent solids in a 50/50 mixture of xylene and n-butanol, a weight per gallon of 7.79, color of 1 to 2 and an acid value of 2.7.

Films prepared from this solution are well-cured after a twenty minute bake at 350° F., have a pencil hardness of 3B and pass an 80 inch-pound bump test.

*Example 7*

As previously described, 750 parts of dehydrated castor oil are reacted with 480 parts of styrene, 45 parts of acrylic acid, and 102 parts of acrylamide in 339 parts of xylene and 744.5 parts of n-butanol using 45 parts of cumene hydroperoxide as catalyst. After the polymerization reaction (96 percent conversion), the polymer solution is reacted with 215 parts of Butyl Formcel and 3 parts of maleic anhydride. The resulting solution has a viscosity of E to F at 50 percent solids in a 50/50 mixture of xylene and n-butanol, a weight per gallon of 7.7, color 6 to 7, and acid value of 25.0.

Films prepared from this solution on steel panels, bonderized with zinc phosphate are well cured after heating at 350° F. for twenty minutes. The films are quite flexible and have good adhesion in that they pass an 80 inch-pound bump test. The pencil hardness of the films is 4B.

*Example 8*

To a 2 liter flask equipped as in the preceding examples are added 356 parts of xylene, 600 parts of linseed oil, and 7.5 parts of benzoyl peroxide. In a separate container, 600 parts of styrene, 149 parts of acrylamide and 750 parts of isopropanol are codissolved with 7.5 parts of benzoyl peroxide. Ten percent of this solution is added to the reaction flask, heat and agitation are applied, raising the temperature to reflux (221° F.). The remaining monomer solution is added to the flask over a one-hour period, the temperature dropping to 198° F. Heating at reflux (199° F. to 200° F.) is continued for three hours. 15 parts of benzoyl peroxide in 180 parts of xylene are added. Heating is continued for 4.5 hours at 200° F. Conversion to polymer after this time is 86.5 percent. An additional 15 parts of benzoyl peroxide in 272 parts of xylene are added. After five additional hours of heating at 200° F., 95 percent conversion of monomers to polymer is obtained. Heat is removed from the reaction flask and 138 parts of paraformaldehyde and 4 parts of maleic anhydride are added. Heat is reapplied for seven hours at 202° F. to 204° F. The solution is cooled and filtered. The polymer solution has a viscosity of A to B at 47.3 percent solids in a 50/50 mixture of xylene and isopropanol, the weight per gallon is 7.76, color 8 to 9, and acid value 3.1.

Films are prepared from this solution and are cured at 350° F. for twenty minutes. The films pass an 80 inch-pound bump test and have a pencil hardness of F.

*Example 9*

Using the same procedure as described previously, 300 parts of linseed oil are reacted with 150 parts of methyl methacrylate, 675 parts of vinyl toluene and 170 parts of acrylamide in 252 parts of xylene and 743 parts of n-butanol, using 90 parts of cumene hydroperoxide. After the polymerization reaction is complete (98 percent conversion), the solution is further reacted with 358 parts of Butyl Formcel and 4 parts of maleic anhydride. The resulting solution has a viscosity of G to H at 50 percent solids in a 50/50 mixture of xylene and n-butanol, weight per gallon of 7.85, color of 9, and acid value of 2.1.

Films prepared from this solution are well-cured after a twenty-minute bake at 350° F. Their pencil hardness is HB.

*Example 10*

As described in the preceding examples, 450 parts of non-break safflower oil are reacted with 750 parts of 2-ethyl-hexyl acrylate and 136 parts of acrylamide in 280 parts of xylene and 744 parts of n-butanol using 90 parts of cumene hydroperoxide as catalyst. When the polymerization reaction is complete (97 percent conversion), the polymer solution is further reacted with 287 parts of Butyl Formcel and 4 parts of maleic anhydride. The resulting solution has a viscosity of $A_1$ to A at 50 percent solids in a 50/50 mixture of xylene and n-butanol, a weight per gallon of 7.63, color of 4, and acid value of 2.9.

Films are prepared from this solution on steel panels bonderized with zinc phosphate. The films cure after a twenty-minute bake at 350° F., but have a tacky surface. Their pencil hardness is less than 7B and they pass an 80 inch-pound bump test.

*Example 11*

As described in the preceding examples, a polymeric solution is prepared from 20 parts of soybean oil, 15 parts of butyl methacrylate, 35 parts of vinyl toluene and 14.9 parts of methacrylamide, followed by reaction in Butyl Formcel. The resulting polymer is composed of 20 weight percent soybean oil, 15 weight percent butyl methacrylate, 35 weight percent vinyl toluene and 30 weight percent butylated methylol methacrylamide dissolved at 50 percent solids in a 50/50 mixture of xylene and n-butanol. The solution properties are: viscosity, I to J, weight per gallon 7.81, color 3 to 4, and acid value 2.9.

Films prepared from this solution have a pencil hardness of 3B after a ttwenty-minute bake at 350° F. and pass an 80 inch-pound bump test.

*Example 12*

Using the same procedure as previously described, a polymeric solution is prepared from 40 parts of a linseed fatty acid ester of pentaerythritol (88.1 weight percent linseed fatty acids and 11.9 weight percent pentaerythritol), 33 parts of vinyl toluene, 2 parts of methacrylic acid and 11.3 parts of acrylamide followed by reaction in Butyl Formcel. The polymer, dissolved at 50 percent solids in a 50/50 mixture of xylene and n-butanol has a viscosity of V and W, weight per gallon of 7.85, color of 8 to 9 and acid value of 16.8.

Films prepared from this solution on steel panels have a pencil hardness of 4B after a twenty-minute bake at 350° F. These films pass an 80 inch-pound bump test, exhibiting good flexibility and adhesion.

Example 13

Using the same procedure as described in Example 1, a polymer solution is prepared from dehydrated castor oil, styrene, acrylamide and Butyl Formcel in which the polymer is composed of 37.5 weight percent dehydrated castor oil, 37.5 weight percent styrene and 25 weight percent butylated methylol acrylamide. The physical constants of this polymer solution (50 percent solids in a 50/50 mixture of xylene and n-butanol) are: viscosity N to O, weight per gallon 7.82, color 5 to 6, and acid value 2.2.

Films prepared from this solution on steel panels have a pencil hardness of 2B after a twenty-minute bake at 350° F. These films pass an 80 inch-pound bump test, exhibiting good flexibility and adhesion.

A primer paint composition is prepared from the polymer solution by grinding the following components in a steel ball mill: 10.116 parts of the polymer solution; 8.179 parts of xylene; 14.805 parts of rutile titanium dioxide; 14.805 parts of barytes; 14.805 parts of lithopone; 0.062 part of lampblack; 0.185 part of Cab-O-Sil; 0.493 part of surfactant (Nuosperse 657–a general paint dispersant). After a sixteen-hour grind, 34.550 parts of the polymer solution and 2 parts of xylene are blended into the mixture. This pigmented composition has a viscosity of 60 seconds when measured by a No. 4 Ford Cup. The formulation is reduced with xylene to a viscosity of twenty seconds as measured by a No. 4 Ford Cup and is sprayed on steel panels bonderized with zinc phosphate. After a twenty-minute bake at 350° F., the film has a pencil hardness of 2H and is not affected by a one-minute soak in xylene.

Example 14

To a 3 liter flask equipped as described in the preceding examples are added 228 parts of xylene, 375 parts of dehydrated castor oil, 10 parts of cumene hydroperoxide and 5 parts of ditertiary butyl peroxide. In a separate container, 375 parts of styrene, 250 parts of butylated methylol acrylamide, 10 parts of cumene hydroperoxide and 5 parts of ditertiary butyl peroxide are co-dissolved in 500 parts of butyl alcohol. Ten percent of this solution is added to the reaction flask and heat is applied raising the temperature to reflux (290° F.). The remainder of the solution is added over a one-hour period with the reflux temperature gradually dropping to 255° F. The temperature is then held for six hours at 255° F. to 260° F. until essentially complete conversion to polymer is obtained.

The solution has a Gardner-Holdt viscosity of Q to R at 50 percent solids in a 50/50 mixture of xylene and butyl alcohol, weight per gallon of 7.74, color of 4 to 5, and an acid value of 2.1.

Films prepared from this solution on steel panels bonderized with zinc phosphate are well cured after a twenty minute bake at 350° F.

Example 15

To a one liter flask equipped with a thermometer, stirrer, reflux condenser and monomer inlet tube are added 127.5 parts of linseed oil modified with 20 weight percent cyclopentadiene, 49.8 parts of butylated methylol acrylamide and 177.3 parts of a commercial aromatic hydrocarbon mixture having a K.B. value of 100 minimum and a boiling point range of 420° F. to 520° F. Nitrogen is introduced into the flask and heat is applied raising the temperature to 392° F. The temperature is held at 392° F. to 400° F. for five hours and twenty minutes. An infrared spectrum of a sample of the product at this time indicates complete reaction as evidenced by the absence of a vinyl unsaturation absorption at 6.15 microns. The hydrocarbon solvent is removed by vacuum distillation and the semi-solid reaction product is dissolved at 60 percent solids in mineral spirits and is filtered.

To 8.3 parts of the 60 percent solution in mineral spirits are added 0.4 part of the morpholine salt of butyl acid phosphate at 50 percent solids in ethylene glycol monobutyl ether and 0.8 part of rare earth naphthenate drier containing 6 percent rare earth metal. 1.5 mil films are drawn down on glass and are baked at 350° F. for thirty minutes. Smooth, clear films are obtained having a pencil hardness of 3H and a color of 21 on the Hunter "b" scale.

Example 16

Using the same procedure as described in Example 15, 127.5 parts of dehydrated castor oil are reacted with 33 parts of styrene and 24.9 parts of butylated methylol acrylamide. 1.5 mil films of the reaction product with 4 weight percent morpholine salt of butyl acid phosphate and 1 percent cobalt naphthenate drier are baked for thirty minutes at 350° F. The resulting smooth, clear films have a pencil hardness of H and a color of 19.4 on the Hunter "b" scale.

Example 17

Using the same procedure as described in Example 15, 127.5 parts of dehydrated castor oil are reacted with 66 parts of styrene and 24.9 parts of butylated methylol acrylamide. Films are prepared from the reaction product with 4 weight percent morpholine salt of butyl acid phosphate and 1 weight percent of cobalt naphthenate. After baking at 350° F. for 30 minutes, the films have a pencil hardness of 2H and a color on the Hunter "b" scale of 17.4.

Example 18

As described in Example 15, 127.5 parts of dehydrated castor oil are reacted with 152.4 parts of styrene and 24.9 parts of butylated methylol acrylamide. Films from the resulting product with the addition of 4 weight percent morpholine salt of butyl acid phosphate and 1 percent cobalt naphthenate drier are cured after a thirty minute bake at 350° F. The clear films have a pencil hardness of 2H and a color of 14.2 on the Hunter "b" scale.

Example 19

To a one liter flask equipped as previously described are added 127.5 parts of linseed oil modified with 20 weight precent cyclopentadiene, 49.8 parts of butylated methylol acrylamide, 177.3 parts of xylene and 8.8 parts of cumene hydroperoxide. Nitrogen is introduced into the flask and heat is applied raising the temperature to 266° F. The condensation reaction is complete after 1.5 hours at 266° F. as evidenced by no vinyl absorption at 6.15 microns in the infra-red spectrum of a sample of the reaction product. The reaction product is then filtered.

To 10 parts of the condensate at 50 percent solids are added 0.4 part of the morpholine salt of butyl acid phosphate at 50 percent solids in ethylene glycol monobutyl ether and 0.8 part of cobalt naphthenate drier (6 percent metal). 1.5 mil films are drawn down on glass and are heated at 350° F. for thirty minutes. Smooth, clear films are obtained with a pencil hardness of 6H and a color on the Hunter "b" scale of 17.

The foregoing examples show that films possessing excellent flexibility and outstanding resistance properties are obtainable by the modification of this invention. In order to illustrate the lack of flexibility of films prepared from polymers which contain no drying oil internal plasticization, the following illustrative examples are prepared.

ILLUSTRATION 1

Using the same procedure as described in Example 1, a polymer solution is prepared in which the polymeric composition is: 50 percent styrene, 30 percent ethyl acrylate, and 20 percent butylated methylol acrylamide. The polymer solution at 54.4 percent solids in a 50/50 mixture of xylene and n-butanol has a viscosity of Z to $Z_1$, weight per gallon of 8.35 color of less than 1, and acid value of 2.3.

Films prepared from this solution are well cured after a twenty minute bake at 350° F. The films have good solvent and detergent resistance, a pencil hardness of 3H, but fail a 10 inch-pound bump test.

ILLUSTRATION 2

Using the same procedure as has been described in the examples, 861 parts of styrene are reacted with 107 parts of methacrylamide in 207 parts of xylene and 534 parts of n-butanol using 64 parts of cumene hydroperoxide as catalyst. After the polymerization reaction is complete, the solution is further reacted with 188 parts of Butyl Formcel and 3 parts of maleic anhydride. The resulting polymer solution has a viscosity of T to U at 50 percent solids in a 50/50 mixture of xylene and n-butanol, weight per gallon of 7.92, color of 1 to 2 and acid value of 2.0.

Films are prepared from this solution on steel panels bonderized with zinc phosphate. The films are well cured after twenty minutes bake at 350° F., have a pencil hardness of H, but fail a 10 inch-pound bump test.

ILLUSTRATION 3

As described previously, a polymer solution is prepared in which the polymer is composed of 25 weight percent styrene, 25 weight percent methyl methacrylate, 30 weight percent ethyl acrylate and 20 weight percent butylated methylol acrylamide. The polymer solution, at 40 percent solids in a 50/50 mixture of xylene and n-butanol, has a viscosity of W to X, a weight per gallon of 8.05, color less than 1 and acid value of 2.1.

Film are prepared from this solution and are well cured after heating for twenty minutes at 350° F. These films have a pencil hardness of 3H and fail a 10 inch-pound bump test.

As can be seen from foregoing illustrations 1 through 3, compositions prepared from N-alkoxymethyl acrylamide and a vinyl monomer can be made into films that cure well and have good hardness. However, these films are brittle as evidenced by their failure when given a 10 inch-pound bump test. Examples 1 through 14, on the other hand, show that the internally modified polymers of this invention have excellent flexibility. This is shown by their passing not only the 10 inch-pound bump test, but even a bump test as severe as the 80 inch-pound test.

What is claimed is:
1. An interpolymer of:
   (1) an N-alkoxymethyl acrylamide wherein the alkoxy portion of the N-alkoxymethyl moiety has less than 10 carbon atoms,
   (2) from 5 to 60% by weight, based on the weight of said interpolymer, of a material selected from the group consisting of natural drying oils, natural semi-drying oils, dehydrated castor oil-pentaerythritol reaction product, linseed fatty acid ester of pentaerythritol, cyclopentadiene modified linseed oil, and styrenated natural drying oil, said material containing polymerizable ethylenic unsaturation and said material being interpolymerized through said polymerizable ethylenic unsaturation, and
   (3) at least one other vinyl monomer copolymerizable with said (1) and (2).
2. An interpolymer as described in claim 1 wherein said (2) is a natural semi-drying oil.
3. An interpolymer as described in claim 1 containing from 10 to 40% by weight of said (1) and at least 10% by weight of said (3), the total of said (1), (2) and (3) being 100% by weight and said weight percentages based on the total weight of said interpolymer.
4. An interpolymer as described in claim 1 containing from 10 to 40% by weight of said (1) and at least 10% by weight of said (3), and wherein said (2) is a natural semi-drying oil, the total of said (1), (2) and (3) being 100% by weight and said weight percentages being based on the total of said interpolymer.
5. An interpolymer as described in claim 1 containing from 10 to 40% by weight of said (1) and at least 15% by weight of said (3), and wherein said (2) is a styrenated natural drying oil, the total of said (1), (2) and (3) being 100% by weight and said weight percentages being based on the total weight of said interpolymer.
6. An interpolymer as described in claim 3 wherein said (1) is N-isopropoxymethyl acrylamide, said (2) is linseed oil and said (3) is styrene.
7. An interpolymer as described in claim 3 wherein said (1) is N-butoxymethyl acrylamide, said (2) is dehydrated castor oil and said (3) is a mixture of acrylic acid and styrene.
8. An interpolymer as described in claim 3 wherein said (1) is N-butoxymethyl acrylamide, said (2) is soya oil and said (3) is vinyl toluene.
9. An interpolymer as described in claim 3 wherein said (1) is N-butoxymethyl acrylamide, said (2) is dehydrated castor oil and said (3) is a vinyl aromatic monomer.
10. An interpolymer as described in claim 3 wherein said (1) is N-butoxymethyl acrylamide, said (2) is dehydrated castor oil and said (3) is styrene.
11. A primer, the vehicle of which includes on interpolymer of:
   (1) from 10% to 40% by weight of an N-alkoxymethyl acrylamide wherein the alkoxy portion of the N-alkoxymethyl moiety has less than 10 carbon atoms,
   (2) from 5 to 60% by weight of a material selected from the group consisting of natural drying oils, natural semi-drying oils, dehydrated castor oil-pentaerythritol reaction product, linseed fatty acid ester of pentaerythritol, cyclopentadiene modified linseed oil, and styrenated natural drying oil, said material containing polymerizable ethylene unsaturation and said material being interpolymerized through said polymerizable ethylenic unsaturation, and
   (3) at least 10% by weight of at least one other vinyl monomer copolymerizable with said (1) and (2), the total of said (1), (2) and (3) being 100% by weight and said weight percentages being based on the total weight of said interpolymer.
12. An article having a metallic surface having as a coating thereon a heat-hardened film of the resinous composition of claim 11.

References Cited

UNITED STATES PATENTS

| | | | |
|---|---|---|---|
| 2,919,254 | 12/1959 | Christenson et al. | 260—21 |
| 3,010,976 | 11/1961 | Greenspan et al. | 260—23.7 |
| 3,163,615 | 12/1964 | Sekmakas | 260—21 |
| 3,222,309 | 12/1965 | Sekmakas | 260—23.7 |

DONALD E. CZAJA, *Primary Examiner.*

LEON J. BERCOVITZ, *Examiner.*

R. A. WHITE, *Assistant Examiner.*